United States Patent
Santos et al.

(10) Patent No.: US 9,668,494 B2
(45) Date of Patent: Jun. 6, 2017

(54) PRESERVED CUT FRESH PRODUCE WITH TRUE-TO-NATURE FLAVOR

(71) Applicants: FONA International Inc., Geneva, IL (US); NatureSeal, Inc., Lincoln, RI (US)

(72) Inventors: Stephen A. Santos, Cumberland, RI (US); Robert M. Sobel, Elburn, IL (US)

(73) Assignees: FONA International Inc., Geneva, IL (US); NatureSeal, Inc., Lincoln, RI (US)

(*) Notice: Subject to any disclaimer, the term of this patent is extended or adjusted under 35 U.S.C. 154(b) by 0 days.

(21) Appl. No.: 14/857,494

(22) Filed: Sep. 17, 2015

(65) Prior Publication Data

US 2016/0113300 A1  Apr. 28, 2016

Related U.S. Application Data

(60) Provisional application No. 62/068,385, filed on Oct. 24, 2014.

(51) Int. Cl.
| | |
|---|---|
| A23L 1/22 | (2006.01) |
| A23B 7/10 | (2006.01) |
| A23B 7/154 | (2006.01) |
| A23L 19/00 | (2016.01) |
| A23L 19/12 | (2016.01) |
| A23L 27/00 | (2016.01) |

(52) U.S. Cl.
CPC ............ *A23B 7/10* (2013.01); *A23B 7/154* (2013.01); *A23L 19/03* (2016.08); *A23L 19/12* (2016.08); *A23L 27/00* (2016.08); *A23L 27/88* (2016.08); *A23V 2002/00* (2013.01)

(58) Field of Classification Search
CPC .......... A23L 27/00; A23L 27/88; A23L 29/00; A23V 2200/15; A23V 2200/16
USPC ................................ 426/231, 615, 650, 419
See application file for complete search history.

(56) References Cited

U.S. PATENT DOCUMENTS

| | | | |
|---|---|---|---|
| 3,669,684 A | 6/1972 | Weaver | |
| 3,764,348 A | 10/1973 | Huxoll et al. | |
| 4,998,522 A | 3/1991 | Achleitner | |
| 5,922,382 A | 7/1999 | Powrie | |
| 5,925,395 A | 7/1999 | Chen | |
| 5,939,117 A | 8/1999 | Chen et al. | |
| 7,824,723 B2 | 11/2010 | Snyder | |
| 7,851,002 B2 | 12/2010 | Hekal | |
| 7,931,926 B2 | 4/2011 | Lidster | |
| 8,101,221 B2 | 1/2012 | Chen et al. | |
| 8,609,169 B2 | 12/2013 | Chen et al. | |
| 2004/0071845 A1 | 4/2004 | Hekal et al. | |
| 2005/0084602 A1 | 4/2005 | Chen et al. | |
| 2007/0026120 A1 | 2/2007 | Wight | |
| 2007/0042093 A1 | 2/2007 | Lidster | |

FOREIGN PATENT DOCUMENTS

| | | |
|---|---|---|
| WO | 95/32632 A1 | 12/1995 |
| WO | 03/104730 A2 | 12/2003 |

OTHER PUBLICATIONS

International Search Report and Written Opinion from International Application No. PCT/US2015/055064 date of mailing Feb. 5, 2016.
Lanciotti, Rosabla et al., "Application of hexanal, (E)-2-hexenal, and hexyl acetate to improve the safety of fresh-sliced apples," Journal of Agricultural and Food Chemistry, vol. 51, No. 10, May 7, 2003, pp. 2958-2961.
Bett, K.L. et al., "Flavor of fresh-cut gala apples in barrier film packaging as affected by storage time," Journal of Food Quality, vol. 24, No. 2, 2001, pp. 141-156.
Komthong et al., Determination of Potent Odorants in Apple by Headspace Gas Dilution Analysis, © 2005 Swiss Society of Food Science and Technology, Published by Elsevier, available on line at www.sciencedirect.com LWT 39 (2006)472-478.
Echeverria et al., Physiochemical Measurements in 'Mondia Gala' Apples Stored at Different Atmospheres: Influence on Consumer Acceptability, Postharvest Biology and Technology 50 (2008) 135-144 © 2008 Elsevier B.V.
Towards the Development of Molecular Markers for Apple Volatiles, Flavour and Fragrance Journal, 2012, 27, 286-289, (wileyonlineliabrary.com DOI 10.1002/ff), 3097.
Song et al., Analysis of Volatile Organic Compounds of "Fuji" Apples Following Electron Beam Irradiation and Storage, Radiation Physics and Chemistry, 81 (2012)1084-1087.

*Primary Examiner* — Helen F Heggestad
(74) *Attorney, Agent, or Firm* — Calfee, Halter & Griswold LLP

(57) ABSTRACT

The flavor loss that occurs after a cut piece of fresh fruit or vegetable is preserved with calcium ascorbate and then stored is remedied by adding flavor augmenting chemicals to the cut piece of fruit or vegetable along with the calcium ascorbate. The types and amounts of flavor augmenting chemicals are selected to just compensate for this flavor loss and not introduce any new, foreign flavor notes into the fruit or vegetable.

27 Claims, No Drawings

PRESERVED CUT FRESH PRODUCE WITH TRUE-TO-NATURE FLAVOR

CROSS-REFERENCE TO RELATED APPLICATION

This application is based on and claims priority to prior provisional application Ser. No. 62/068,385, filed Oct. 24, 2014, the entire disclosure of which is incorporated herein by reference.

BACKGROUND

U.S. Pat. No. 5,939,117 and U.S. Pat. No. 8,101,221, the disclosures of which are incorporated herein by reference, describe processes for preserving fresh produce, i.e., fresh fruits and/or vegetables, which have been cut or sectioned to expose the flesh of the fruit or vegetable underneath its outer skin. In these processes, the cut fresh produce is contacted with an aqueous preservative solution containing ascorbate and/or erythrobate anions and a metal cation such as calcium, after which the treated cut fresh produce is stored for later consumption. Although storage can occur in bulk, the treated cut fresh produce is normally packaged in some type of container for shipment to different locations.

This process does an excellent job in preserving the flavor, texture, aroma, crispness and color of the cut fresh produce and is widely used commercially throughout the world. It is the technology of choice, not only because it is highly effective in terms of its preserving ability but also because it is essentially benign in terms of flavor. That is to say, it adds no discernible flavor to the cut fresh produce being preserved, even though it is a highly effective preservative.

However, even though this technology is highly effective, a noticeable loss in flavor may still occur due to the loss of particular flavor notes if the cut fresh produce is stored for any appreciable length of time. In this regard, see ASTM's Manual on Descriptive Analytical Testing for Sensory Evaluation, edited by Robert C. Hootman, which describes the concept of "flavor notes" in food products. Depending on the particular fruit or vegetable being preserved, this noticeable diminution in flavor can occur shortly after the fresh produce is cut to expose its flesh.

SUMMARY

In accordance with this invention, this unavoidable loss in flavor is compensated for by determining which particular naturally-occurring flavor producing chemicals are lost from the fresh produce upon being cut and then stored and then adding these or analogous chemicals to the cut fresh produce as part of the preserving process in amounts which are just sufficient to compensate for the flavors that will be lost. The result is a preserved cut produce product which exhibits a true-to-nature flavor, i.e., a flavor resembling as closely as possible the flavor of the fresh produce before it is cut.

Thus, this invention provides a preserved and flavor augmented cut fresh produce product comprising a piece of cut fresh produce, a preservative being present in an amount sufficient to preserve at least one of the texture, firmness, flavor, appearance, crispness and color of the piece of cut fresh produce, and one or more flavor augmenting chemicals being present in an amount which is sufficient to compensate for a loss of flavor notes the cut fresh produce product will experience during storage but not so much as to introduce foreign flavor notes into the cut fresh cut produce product.

In addition, this invention also provides a process for preserving and augmenting the flavor of a piece of cut fresh produce which is intended to be consumed a predetermined period of time after the fresh produce from which it is made has been cut, the process comprising contacting the cut piece of fresh produce with an aqueous preservative composition containing a preservative capable of preserving at least one of the texture, firmness, flavor, appearance, crispness and color of the fresh cut produce, thereby producing a preserved cut piece of fresh produce, and impregnating the preserved cut piece of fresh produce with one or more flavor augmenting chemicals in an amount which is sufficient to replace the flavor notes that are anticipated to be lost from the preserved cut piece of fresh produce as a result of being stored for the predetermined period of time but not so much as to introduce foreign flavor notes into the preserved cut piece of fresh produce.

DETAILED DESCRIPTION

Definitions

In physiology, it is understood that only five sensory perceptions are discernible by the mouth in general and the tongue in particular, sweetness, saltiness, sourness, bitterness and umami. All other sensory perceptions relating to taste/flavor derive from odors sensed by olfactory sensors in the nasal cavity.

Therefore, it is commonly accepted that "taste" refers only to the five sensory perceptions that are discernible by the mouth and tongue, i.e., sweetness, saltiness, sourness, bitterness and umami while "flavor" refers to the overall sensory perception derived from the combination of the taste sensory perceptions produced in the mouth plus the odor sensory perceptions produced in the nasal cavity. That same conventional usage of "taste" and "flavor" is used in this disclosure as well.

Cut Fresh Produce

This invention can be used for treating any type of produce, i.e., fruits and vegetables. In particular embodiments, it is beneficially used for treating produce in which the body or "flesh" of the fruit or vegetable is covered by a protective skin.

Examples of particular cut fresh fruit that can be treated in accordance with this invention include apples, apricots, avocadoes, pears, Asian pears, cherries, strawberries, plums, peaches, nectarines, grapes, melons (including watermelon, cantaloupe, honey dew melon, muskmelon, etc.), guava, dates, figs, apricots, kiwi, citrus fruit (including lemons, limes, grapefruit, oranges, tangelos, kumquats, ugli fruit, mandarin oranges, Satsuma oranges, etc.), plums, mango, bananas, passion fruit, pineapple, cranberries, blueberries, raspberries, blackberries, cherries, papaya, coconut, jackfruit, and others.

Meanwhile, examples of particular cut fresh vegetables that can be processed in accordance with this invention include arugula, asparagus, beets, bell peppers, bok choy, broccoli, Brussels sprouts, cabbage, carrots, cauliflower, celery, collard greens, corn, cucumbers, dandelion greens, eggplant, garlic, green beans, green peas, kale, leeks, mushrooms, mustard greens, okra, olives, onions, parsnips, potatoes, pumpkin, romaine lettuce, spinach, squash, summer, squash, winter, sweet potatoes, Swiss chard, turnip greens, watercress, yams, zucchini and Jicama.

The produce to which this invention applies is both "fresh" and "cut." In the context of this disclosure, "fresh" has the same meaning as found in 58 C.F.R. §2426 of the U.S. Code of Federal Regulations, as follows:

(a) The term "fresh," when used on the label or in labeling of a food in a manner that suggests or implies that the food is unprocessed, means that the food is in its raw state and has not been frozen or subjected to any form of thermal processing or any other form of preservation, except as provided in paragraph (c) of this section.

(c) Provisions and restrictions. (1) The following do not preclude the food from use of the term "fresh:" (i) The addition of approved waxes or coatings; (ii) The post-harvest use of approved pesticides; (iii) The application of a mild chlorine wash or mild acid wash on produce; or (iv) The treatment of raw foods with ionizing radiation not to exceed the maximum dose of 1 kiloGray in accordance with 179.26 of this chapter. (2) A food meeting the definition in paragraph (a) of this section that is refrigerated is not precluded from use of "fresh" as provided by this section. [58 FR 2426, Jan. 6, 1993]

Similarly, in the context of this disclosure, "cut" will be understood to mean that, starting with this fresh produce in its native or virgin state (i.e., as received from its supplier—raw, unpeeled and uncut), its skin or flesh is penetrated, severed or removed in a manner which exposes the body or flesh of the produce underneath the skin to the open atmosphere. Cutting can be done by any known technique such as paring, slicing, coring, dicing, peeling, tearing, carborundum peeling or combinations thereof, but will normally be done by sectioning, i.e., subdividing the fresh produce into a number of discrete pieces.

In some embodiments, such as in the case of lettuce, for example, the produce will have no skin as that term in normally understood. In these embodiments, the produce will be understood as being "cut" when it is separated into sections whether by means of a knife or other cutting instrument or by mechanical tearing.

In those embodiments in which the produce is understood to have a skin such as in the case of an apple, mango or avocado, the produce will be understood to have been "cut" within the context of this disclosure if the produce is sectioned, whether or not some or all of the skin is left on the discrete sections produced by the cutting. In addition, a piece of produce which has been wholly or partially peeled will also be regarded as being "cut" within the context of this disclosure, even it has not been sectioned.

Prior to cutting, the fresh produce can be sanitized to reduce or eliminate microorganisms on its surface/skin. Good results have been obtained using a 50-100 ppm sodium hypochlorite solution.

Preservation Treatment

In accordance with the first step of this invention, the cut fresh produce is contacted with an aqueous preservative composition which contains one or more preserving chemicals to preserve one or more of its texture/firmness, flavor, appearance, crispness and color.

Many different chemicals, usually supplied in aqueous solutions and/or dispersions, are known to exhibit a preserving effect on fresh cut fruit and vegetables. Examples include low molecular weight organic acids such as citric acid, malic acid, acetic acid, lactic and ascorbic acid, metal salts of such acids such as those containing Ca, Mg, Zn, Sn, Sr, Li, Ba, Al, Cu, NH4, Mn, K and Fe ions, various different chloride salts such as calcium chloride, various different sulfite salts such as sodium metabisulphate, potassium metabisulphite, sodium bisulphite, sodium disulphite, and calcium bisulphite, various metal ion sequestrants such as metal acid polyphosphate and various different tocopherols such as $\alpha$-tocopherol. Various different film forming agents are also known to provide a preserving effect, examples of which include waxes, gums, polysaccharides, such as hydroxymethyl cellulose, methyl cellulose, microcrystalline cellulose, alginates, carrageenans, lipids, pectins, modified starches, locust bean gum, xanthum gum, gellan gum, guar gum, and tragacaths.

Any of these preserving chemicals, when dissolved and/or dispersed in water, can be used to form the aqueous preservative composition used in this invention. Preferably, this aqueous preservative composition is based on the combination of the ascorbate anion and one or metal cations. The ammonium cation can also be used. In addition, if desired, some or all of this ascorbate anion can be replaced by the erythrobate anion, which is the stereoisomer of the ascorbate ion.

Aqueous preservative compositions based on the combination of the ascorbate/erythrobate anion and a metal and/or ammonium cation are well known and described in many patents and patent applications See, for example, U.S. Pat. No. 3,764,348 to Huxsoll et al., U.S. Pat. No. 4,988,522 to Warren, U.S. Pat. No. 5,925,395 to Chen, U.S. Pat. No. 5,939,117 to Chen et al., U.S. 2004/0071845 to Hekal et al. and U.S. 2005/0084602 to Chen et al., and See, also, U.S. Pat. No. 7,931,926 to Lidster et al., U.S. Pat. No. 7,851,002 to Hekal et al., U.S. Pat. No. 8,101,221 to Chen et al. and U.S. Pat. No. 8,609,169 to Chen et al. The disclosures of all of these documents are incorporated herein by reference in their entireties.

Particularly effective aqueous preservative solution compositions for use in this invention are based on the combination of the ascorbate and/or erythrobate anion and one or more cations selected form Ca, Mg, Zn, Sn, Sr, Li, Ba, Al, Cu, $NH_4$, Mn, and K. Calcium, magnesium and, to a lesser extent lithium, are preferred, while calcium is especially preferred.

The easiest way of formulating an aqueous preservative solution containing these active ingredients is to dissolve a suitable amount of an ascorbate or erythrobate salt of the desired cation, e.g., calcium ascorbate, in water. Alternatively, ascorbic and/or erythrobic acid plus a source compound comprising an oxide of the desired cation, or a hydroxide of the desired cation, or a salt of the desired cation with an essentially benign anion, can be dissolved in the water. Examples of essentially benign anions that can be used for this purpose include food grade organic acids which are free of sulfur and nitrogen (e.g., acetates, lactates, propionates, maleates, itaconates, glyconates, etc.) chlorides, carbonates, phosphates, glycerophosphates, and so forth.

Specific metal ion containing compounds that can be used for formulating the aqueous preservative compositions of this invention include calcium ascorbate, calcium erythrobate, calcium hydroxide, calcium carbonate, calcium phosphate, calcium acetate, calcium gluconate, calcium glycerophosphate, calcium lactate, magnesium ascorbate, magnesium erythrobate, magnesium chloride, magnesium carbonate, magnesium phosphate, magnesium oxide, magnesium acetate, magnesium gluconate, magnesium glycerophosphate, magnesium lactate, lithium ascorbate, lithium erythrobate, sodium ascorbate and sodium erythrobate. Mixtures of these compounds can also be used.

The aqueous preservative composition of this invention may also contain a variety of additional food-grade ingredients known to exert a preserving effect. Examples include other antioxidants such as sulfites, chelating agents such as citric acid, acetic acid and other organic acids (other than ascorbic acid and erythrobic acid), metal sequestrants such as sodium pyrophosphate, flavorants such as sodium ions, chloride ions and the like, emulsifiers, proteins, starches, individual amino acids and the like. However, this is not preferred, because the additional preserving effect these additional ingredients can provide is only marginal and, moreover, they usually generate a noticeable unpleasant flavor if used in more than insignificant (deminimis) amounts. For this reason, and as further discussed below, the aqueous preservative compositions of this invention are normally free or essentially free of these additional ingredients.

The concentration of active ingredients (i.e., preserving chemicals) in these aqueous compositions can vary widely, and essentially any amount can be used which is capable of providing the desired preserving effect. In this connection, while the concentration of active ingredients in the aqueous preservative composition of this invention can be greater than a saturation concentration such that at least some of these active ingredients are present as dispersed solids, it is desirable that this concentration be no more than, and preferably less than, a saturation concentration so that all of these active ingredients are dissolved in the aqueous carrier liquid forming this composition, thereby forming a true solution of these ingredients. In this context, "true solution" and "solution" when made in reference to an aqueous composition containing a particular active ingredient connotes that all of that ingredient is dissolved in the aqueous carrier liquid of this composition. Forming true solutions of active ingredients is desirable as it avoids having a portion of these ingredients deposit on the fresh produce being preserved in the form of particulate solids. These particulate solids are desirably avoided, since they would impart an unnatural grittiness to or other disagreeable "mouthfeel" to the cut fresh produce being preserved. Therefore, the concentration of the active ingredients (and preferably all ingredients) in the aqueous preservative composition of this invention is desirably kept at or below a saturation level.

With this constraint in mind, typical total concentrations (i.e., the concentrations of all chemical preservative ingredients combined) in the aqueous preservative compositions of this invention can be as low as 0.5 wt. %. and as high as 50 wt. %. More commonly, the minimum concentration of these chemical preservative ingredients will be >0.5 wt. %, ≥1 wt. %, ≥2 wt. %, ≥3 wt. %, ≥4 wt. %, ≥5 wt. %, ≥7 wt. %, ≥10 wt. %, or even ≥15 wt. %, while the maximum concentration of these chemical preservative ingredients will normally be <50 wt. %, ≤45 wt. %, 40 wt. %, ≤35 wt. %, ≤30 wt. %, ≤5 wt. %, 20 wt. %, ≤15 wt. %, or even ≤10 wt. %. Concentration ranges on the order of 1 to 40 wt. %, 2 to 30 wt. %, 3 to 25 wt. %, 4 to 20 wt. %, 5 to 15 wt. % and even 7 to 12 wt. % are contemplated.

The pH of the aqueous preservative compositions of this invention is preferably from 1.7 to 10, more preferably from 3 to 9, 5 to 8, or even 5.5 to 7. In some instances, acidic conditions may be desired, in which case the pH can be 3 to <7, 3.5 to 6 or even 4 to 5.5. pH can be adjusted if needed with conventional reagents such as, for example, conventional acids such as hydrochloric acid, or conventional bases such as sodium hydroxide.

As indicated above, the aqueous preservative composition of this invention is desirably free or essentially free of ingredients which contribute a poor flavor to the produce being preserved. In this context "essentially free" will be understood as meaning that the concentrations of these undesirable ingredients is low enough so that no unpleasant flavor note generated by that ingredient can be discerned. In this regard, it will be appreciated that the concentration level at which unpleasant flavor notes become discernible varies from ingredient to ingredient, and so no concrete maximum concentration limit is appropriate for all possible additional ingredients.

With that background in mind, we can say that as a general guideline the concentration of ingredients which are capable of generating a disagreeable flavor are optionally, yet desirably, maintained at the concentration limits given below. Note, in this regard, that these concentration limits are provided on a dry weight basis, i.e., based on the weight of all ingredients of the aqueous preservative composition excluding water. They are not based on the weight of the entire aqueous preservative composition as a whole. This is because the concentrations of the active ingredients in the aqueous preservative compositions used in this invention can vary greatly and further because essentially all of the water in these aqueous preservative compositions will have evaporated or otherwise been removed before the produce preserved with these compositions is tasted.

For the best flavor, the concentration of chloride ion in the aqueous preservative compositions of this invention is preferably not greater than 35%, more preferably not greater than 13%, yet even more preferably not greater than 5%, not greater than 1%, not greater than 0.5% or even not greater than 0.1%, by weight of the dry ingredients. Similarly, for the best flavor, the concentration of sodium ion in the aqueous preservative compositions of this invention is preferably not greater than 10%; more preferably not greater than 5%, even more preferably not greater than 1%, not greater than 0.5% or even not greater than 0.1%, by weight of the dry ingredients.

Preferably, the concentrations of citric acid, citrate ion, acetic acid, acetate ion, lactic acid, lactate ion, malic acid, malate ion, including the salts of such acids, as well as other acids and acid ions, (with the exception of ascorbic acid, ascorbate ion and erythorbic acid, erythorbate ion), in the aqueous preservative compositions of this invention are not greater than 20%, more preferably not greater than 10%, even more preferably not greater than 5%, even more preferably not greater than 1%, yet even more preferably not greater than 0.1%; most preferably not greater than 0.05% or even 0.01% by weight, of the dry ingredients. If citric acid or citrate is employed, it is preferred that there is more ascorbic acid than citric acid and/or it is preferred that there is more ascorbate than citrate.

Again, for best flavor, the total concentration of metal ion sequestrants, particularly an acidic polyphosphate metal ion sequestrant, as well as the total concentration of chelants in the aqueous preservative compositions of this invention are each preferably not greater than 5%, more preferably not greater than 2%, even more preferably not greater than 1.0%, even more preferably not greater than 0.5%, yet even more preferably not greater than 0.1%; most preferably not greater than 0.05% or even 0.01%, by weight, of the dry ingredients.

Preferably, the total concentration of sulphites in the aqueous preservative compositions of this invention is not greater than 5%, more preferably not greater than 2%, even more preferably not greater than 1.0%, even more preferably not greater than 0.5%, yet even more preferably not greater than 0.1%; most preferably not greater than 0.05% or even 0.01% by weight, of the dry ingredients. Sulphites include for example sodium metabisulphate, potassium metabisulphite, sodium bisulphite, sodium disulphite, and calcium bisulphite.

Preferably, the concentrations of each of flavonoids, rose hips, and pineapple juice in the aqueous preservative compositions of this invention are not greater than 5%, more preferably not greater than 2%, even more preferably not greater than 1.0%, even more preferably not greater than 0.5%, yet more preferably not greater than 0.1%; most preferably not greater than 0.05% or even 0.01%, by weight, of the dry ingredients.

Preferably, the total concentration of tocopherols, particularly alpha tocopherol, in the aqueous preservative compositions of this invention is not greater than 5%, more preferably not greater than 2%, even more preferably not greater than 1.0%, even more preferably not greater than 0.5%, yet more preferably not greater than 0.1%; most preferably not greater than 0.05% or even 0.01%, by weight, of the dry ingredients.

It is also preferred that the aqueous preservative compositions of this invention are free or essentially free of agents which affect the "mouth feel" of the cut fresh produce such as by imparting a waxy or slippery feel to the produce. Examples of such agents are gelling agents, film forming agents, waxes, gums, polysaccharides, such as hydroxymethyl cellulose, methyl cellulose, microcrystalline cellulose, alginates, carrageenans, lipids, pectins, modified starches, locust bean gum, xanthum gum, gellan gum, guar gum, and tragacaths. Thus, the total concentration of these agents in the aqueous preservative compositions of this invention preferably is not greater than 5%, more preferably not greater than 2%, even more preferably not greater than 1.0%, yet even more preferably not greater than 0.5%, still even more preferably not greater than 0.1%; most preferably not greater than 0.01% by weight, of the dry ingredients.

Finally, it is also preferable that the concentration of each of lecithin, emulsifier, protein, and individual amino acids, such as cysteine, more specifically L-cysteine, in the aqueous preservative compositions of this invention is not greater than 5%, more preferably not greater than 2%, even more preferably not greater than 1.0%, yet even more preferably not greater than 0.5%, still even more preferably not greater than 0.1%, most preferably not greater than 0.05% or even 0.01%, by weight of the dry ingredients.

As indicated above, although the aqueous preservative compositions of this invention as described above can be applied to the fresh cut produce to be treated by this invention without any pretreatment, it is desirable to sanitize the fresh produce before it is cut to reduce or eliminate any microorganisms that may be present on the surfaces of its skin. Good results have been obtained using an aqueous sodium hypochlorite solution containing 50-100 ppm available chlorine.

The sanitized fresh produce is then processed such as for example, by paring, slicing, coring, dicing, peeling or a combination thereof. Thereafter, the cut sanitized fresh produce can optionally be sanitized or washed again, preferably with the same sanitizing solution mentioned above, and then treated with an aqueous preservative composition of this invention, as described above. This can be done by applying the aqueous preservative composition, normally at or below ambient temperature, by conventional techniques such as spraying, dipping, sprinkling, tossing, immersing or drenching. Dipping involves immersing the produce into the aqueous preservative composition and is generally preferred. Good results have been obtained by dipping the cut fresh produce for 1-2 minutes. Longer dipping times are also employed; dipping times over 15 minutes might affect flavor.

Flavor Augmentation

In accordance with the second step of this invention, one or more flavor augmenting chemicals is impregnated into the cut piece of fresh produce in a manner so as to compensate for the loss in flavor that inherently occurs as a result of it being cut and then stored in the manner indicated above. As a result, a preserved and flavor augmented cut fresh produce product is produced which has a true-to-nature flavor, i.e., a flavor that resembles as closely as possible the flavor of the fresh produce before it is cut.

In this regard, a number of earlier disclosures describe processes for treating fresh fruit to enhance its flavor after preservation and storage. See, for example, U.S. Pat. No. 5,922,382, U.S. 2007/0026120 and U.S. Pat. No. 7,824,723. However, the approach of all these disclosures is to add novelty to the fruit eating experience by introducing a foreign flavor note into the fresh fruit being preserved.

For example, the object of U.S. Pat. No. 7,824,723 is to introduce a grape flavor into whole apples, pears and other pome fruits. Similarly, the only specific flavoring described in U.S. Pat. No. 5,922,382 involves adding a liquid natural cinnamon flavor ingredient to sliced Granny Smith apples. In both instances, the flavor ingredient being added is not naturally present in the fresh fruit being modified but rather is foreign to the flavor of the fresh fruit in its naturally occurring condition.

Similarly, while U.S. 2007/0026120 indicates apple flavoring is one of roughly 200 different flavoring agents that can be added to some 50 different fruits including cut fresh apples, there is no suggestion that an apple flavor, without more, should be added to a cut fresh apple. On the contrary, the most pertinent disclosure in this regard is that the flavor of fresh cut apples can be augmented with an "Apple Pie Flavor," which contains a noticeable amount of cinnamon. See, also, Example 3 in which synthetic sweeteners are added in amounts such that the fresh fruit products obtained are "extremely sweet." Accordingly, it is clear that the purpose of this technology is also to modify the natural flavor of the fresh fruit being processed by introducing foreign flavor notes into the fresh fruit being processed, i.e., types and/or amounts of flavorants which produce a flavor which is different from the flavor of these fruits in their naturally occurring fresh condition.

Thus, a "foreign" flavor note in the context of this disclosure will be understood to mean a flavor element or note which is not present in the cut fresh produce being processed in its naturally fresh occurring condition. For example, the cinnamon, bubble gum and melted butter flavors described in the above-noted U.S. 2007/0026120 are foreign flavor notes with respect to an apple, because the flavor of a naturally occurring fresh apple does not include any of these flavor notes. In addition, a "foreign" flavor note in the context of this disclosure will also be understood to include the same flavor note or type of flavor note which is naturally present in the fresh produce being processed, but only if the amount of this flavor note which is added produces a greater intensity of this flavor note than naturally occurs in the fresh produce being treated. So, for example, the high intensity sweetener used in Example 3 of U.S. 2007/0026120 is a foreign flavor note in the context of this disclosure, because the amount of this sweetener that was added provided a flavor sensation that was excessively sweet compared to the flavor of the apples being preserved in their naturally-occurring fresh condition.

Although adding foreign flavor notes according to these earlier disclosures may create modified fruit products with novel and exciting flavors, these modified fruit products provide a very different flavor sensation than experienced from eating the fresh fruit from which these products are made in their naturally-occurring fresh condition.

To this end, this invention departs from these earlier disclosures in that (in addition to preserving) the purpose of this invention is not to modify or enhance the flavor of a cut fresh fruit or vegetable by introducing a foreign flavor note. Rather, the purpose of this invention is to replace the flavor notes which are naturally present in these fruits and vegetables before being cut but which are inherently lost, at least to some degree, as a result of being cut and then stored, without introducing foreign flavor notes. Thus, the purpose and effect of this invention is to produce an ultimate cut fresh produce product which, after optional packaging, storage and optional shipment and upon removal from its storage container if any, exhibits a true-to-nature flavor, i.e., a flavor which is essentially the same as that of the fresh produce from which this product is made before being cut.

To accomplish this result, it is necessary to determine, for each particular fresh fruit and vegetable being processed by this invention the particular flavor notes that will be lost as a result of being cut and then stored. This can be done by carrying out a detailed chemical analysis on a first test sample of the particular fresh fruit or vegetable to be treated to identify all, or at least the major, chemical constituents which contribute to its flavor. This same detailed chemical analysis is then also carried out on a second comparative test sample of this same cut fresh fruit or vegetable after it has been cut and then stored. A comparison of the results of these two analyses will identify, specifically, the particular flavor-producing chemicals which are lost as a result of cutting and storing as well as the amounts of these particular flavor-producing chemicals which are lost.

In accordance with this invention, the "lost" flavor-producing chemicals identified in this way are compensated for by adding back to the cut fresh produce being treated one or more flavor augmenting chemicals which are the same as the flavor-producing chemicals that are lost, or at least of the same type as the flavor-producing chemicals that are lost, in the same amounts that are lost. For example, if the above detailed chemical analysis indicates that a certain amount of fructose is lost, then the same amount of fructose can be added to the cut fresh produce being treated to compensate for the anticipated loss in fructose that will occur as a result of the fresh produce being cut and stored. Instead of fructose, a similar amount of sucrose can be added, since sucrose has a similar sweetening capability as fructose. Instead of fructose and sucrose, a more potent sweetener such as stevia or saccharine can be added. However, if so, a smaller amount of the more potent sweetener is used so as to just compensate for the slight loss in sweetness that will occur due to the lost fructose. In other words, the amount of this more potent sweetener which is added should not be so much that an excessively sweet product is produced.

It will therefore be appreciated that, in the context of this disclosure, when the flavor augmenting chemical which is added to the cut fresh produce is the same "type" of flavor-producing chemical that will be lost, this means that this flavor augmenting chemical produces a flavor note which is the same or substantially the same as this flavor note produced by the flavor-producing chemical that will be lost. In addition, when the same "amount" of such a flavor augmenting chemical is added, this means that the amount added is sufficient to provide the same level or intensity of flavor note or notes that will be lost as a result of the flavor-producing chemical that will be lost.

Determining both the identity and amounts of particular flavor producing chemicals that are lost when particular types and varieties of cut fresh produce are stored can be accomplished by means well known in the art. See, the following publications, which identify many of the volatile flavor producing chemicals found in fresh apples as well as specific analytical techniques that can be used to identify both the identities and amounts of these chemicals that are given off from different types of apples when stored under different conditions: (1) Komthong et al., Determination of Potent Odorants in Apply by Headspace Gas Dilution Analysis, ©2005 Swiss Society of Food Science and Technology, Published by Elsevier, available on line at www.scinecedirect.com LWT 39 (2006)472-478, (2) Echeverria et al., Physiochemical Measurements in 'Mondia Gala' Apples Stored at Different Atmospheres: Influence on Consumer Acceptability, Postharvest Biology and Technology 50 (2008) 135-144 ©2008 Elsevier B.V., (3) Towards the Development of Molecular Markers for Apple Volatiles, Flavour and Fragrance Journal, 2012, 27, 286-289, (wileyonlineliabrary.com DOI 10.1002/ff), 3097, and (4) Song et al., Analysis of Volatile Organic Compounds of "Fuji" Apples Following Electron Beam Irradiation and Storage, Radiation Physics and Chemistry, 81 (2012)1084-1087. The entire disclosures of each of these documents is incorporated herein by reference.

As can be seen from the above-cited Komthong et al. publication, the most odor active compounds found in apples include:
  Methyl-2-methyl butanoate
  Isobutyl acetate
  Ethyl butanoate
  Ethyl-2-methylbutanoate
  Isopentyl formate
  Butyl acetate
  Hexyl acetate
  Hexanol The above literature references provide even more comprehensive lists of these flavor producing chemicals.

The same techniques described in these publications can be used to determine the identities and amounts of flavor producing chemicals which are lost when other types of fresh produce are cut and stored.

In this regard, we have found that a particularly effective way of identifying the volatile flavor producing chemicals that are lost from cut fresh produce is to carry out a head space gas analysis (i.e., an analysis of the gas found at the top of a closed container in which the cut fresh produce has been stored) using solid-phase microextraction ("SPME"). For example, the headspace of freshly sliced gala apples was analyzed via solid-phase microextraction (SPME) by gas chromatography-mass spectrometry (GC-MS). This headspace technique eliminates the use of solvents, leaving the sample in its natural state for extraction. After twenty minutes of equilibration, the volatiles were captured, with separation and identification achieved using gas chromatography-mass spectrometry (GC-MS). Additionally, mass spectral data was supplemented with retention time comparison to flavor chemical standards. Several aldehydes, alcohols, and esters were detected. These included hexanal, trans-2-hexenal, trans-2-hexenol, hexanol, isoamyl acetate, 2-methylbutyl acetate, alpha-pinene, cis-3-hexenyl acetate, hexyl acetate, para cymene, methyl chavicol, decanal, hexyl-2-methylbutyrate, hexyl caproate, and alpha-famesene. Additionally, alkanes, tridecane and tetradecane were detected, most likely due to the apple skin. Of these several compounds, the significant flavor contributors were (in order of abundance) hexyl acetate, methyl chavicol, hexanol, isoamyl acetate, hexanal, trans-2-hexanal, and hexyl caproate.

As indicated above, determination of the types and amounts of flavor producing chemicals which are lost as a result of cutting and storage will normally be done by comparing the results obtained from two different chemical analyses, the first being carried on a first test sample of the fresh produce before storage, the second being carried on a second test sample after storage. Desirably, the first chemical analysis is carried out immediately after cutting, i.e., immediately after the first test sample is formed by cutting the whole (i.e., uncut) fresh produce from which it is made. In this context, "immediately after cutting" will be understood to mean soon enough after cutting so that a noticeable change or loss in flavor does not occur.

As well understood by food chemists, the time it takes a fresh fruit or vegetable to experience a noticeable change or loss in flavor depends on the particular fresh fruit or vegetable involved. Some fruits and vegetables can go weeks and weeks after cutting before any noticeable change or loss in flavor occurs, while others experience a noticeable change or loss in flavor within a few hours or so. So, as a general matter, no particular period of time will qualify as a standard for determining whether a particular chemical analysis has been done "immediately after cutting."

In any event, for best results, it is desirable in accordance with this invention that this first chemical analysis be done as soon as practicable after cutting. Typically, therefore, this first chemical analysis will normally be done within one week, more desirably within 3 days, within 1 day, within 18, hours, within 12, within 6 hours or even within 3 hours of cutting.

In accordance with a particularly interesting embodiment of this invention, the piece of whole (i.e., uncut) fresh produce which is used to supply the first test sample for the first chemical analysis is chosen to have a peak flavor. In this context, "peak" flavor will be understood to mean with respect to a particular piece of fresh produce the best flavor that that particular piece of produce will exhibit over its lifetime.

In this regard, it is well known that the flavor of certain types of fresh produce will begin to deteriorate within a very short time after harvest, i.e., a short time after they are picked off of the trees, vines or plants on which they are grown. Corn and tomatoes are good examples. With respect to these types of fresh produce, "peak flavor" is commonly recognized as lasting for only for a relatively short period of time after harvest, for example, within 24 hours, within 18 hours, within 12, within 8 hours, within 6 hours or even within 3 hours of harvest. Other types of produce such as apples, for example, can be stored after harvesting for extended periods of time before any noticeable change or loss in flavor occurs. For example, some apples can be stored for 6 months or longer before a significant decline in flavor occurs. In connection with these types of produce, peak flavor is commonly recognized as lasting for much longer periods period of time after harvest, for example, as long as within 2 months of harvest, within 4 months of harvest or even within 6 months of harvest.

In accordance with this embodiment of the invention, the piece of whole (i.e., uncut) fresh produce which is used to supply the first test sample for the first chemical analysis is chosen to have a peak flavor. Depending on the particular type of fresh produce involved, this means that the piece of whole fresh produce which is selected to supply this first test sample will desirably have been harvested no earlier than 6 weeks before, more commonly no earlier than 4 weeks before, no earlier than 2 weeks before, no earlier than 1 week before, no earlier than 3 days before or even no earlier than 1 day before this first chemical analysis is done.

The second test sample of fresh produce on which the second chemical analysis of this invention is carried out is desirably obtained from the same piece of whole (i.e., uncut) produce from which the first test sample is obtained. However, a different piece of whole produce can be used for this purpose, provided that there is no significant different in flavor between the two.

In accordance with another interesting embodiment of this invention, the second test sample of fresh produce on which the second chemical analysis of this invention is carried out is treated in a manner which mimics the manner in which it is anticipated that the fresh produce will be treated and/or stored in use. In other words, when it is intended that the fresh produce product of this invention will be stored under a predetermined set of storage conditions including a particular period of storage time, a particular manner of storage, or both, then the second test sample on which the second chemical analysis is carried out is desirably subjected to the same storage conditions before the second chemical analysis is carried out. For example, if it is contemplated that the fresh produce product of this invention will be stored for a week, then the second test sample on which this second chemical analysis is carried out is desirably also stored for a week. Similarly, if it is contemplated that the fresh produce product of this invention will be stored for a week in an unsealed container in a refrigerator maintained at 37° F. (~3° C.), then the second test sample on which this second chemical analysis is carried out is desirably also stored for a week in an unsealed container in a refrigerator maintained at 37° F. (~3° C.).

To this end, in a particularly interesting embodiment of this invention, the second test sample on which the second chemical analysis is carried out is subjected to the same set of predetermined preserving and storage conditions as it is anticipated that the fresh produce product of this invention will see in use. For example, if it anticipated that the fresh cut produce product of this invention (i) will be made with a preservative which comprises 0.5 wt. % calcium ascorbate, (ii) the manner in which the fresh cut produce product of this invention will be stored is by being placed unsealed in a refrigerator maintained at 40° F. (~4° C.), and (iii) the time the fresh cut produce product of this invention will be stored before being eaten is three weeks, then this second test sample will also be preserved with 0.5 wt. % calcium ascorbate and stored unsealed in a refrigerator maintained at 40° F. (~4° C.) for three weeks before being subjected to the second chemical analysis.

Because the cut fresh produce product of this invention may be stored by different consumers in different ways and for various different periods of time, it may also be desirable in some embodiments of this invention to use average values for the results of the second chemical test, these average values being generated by carrying out multiple second chemical analyses on multiple different second test samples which have been subjected to a variety of different storage regimens. For example, multiple second comparative test samples can be prepared which have been stored for different periods of time, or under different types of storage conditions or both, with the analyses obtained from all the samples compiled to give an average value for each particular flavor-producing chemicals that is lost. These average values can then be used to determine the type and amount of flavor augmenting chemicals to add to the cut fresh produce during the flavor augmenting step of this invention.

The flavor augmenting chemicals of this invention can be incorporated into the cut fresh produce of the inventive cut fresh produce product by any conventional technique. For example, the cut fresh produce can be dipped into a tank containing the flavor augmenting chemicals, or it can be inundated with a liquid "sheet" of flavor augmenting chemicals from a flume. Additionally or alternatively, it can be inundated with a high or low pressure spray of the flavor augmenting chemical, and/or it can be sprinkled with taste augmenting chemicals which are solid in form. Vacuum infusion is still another technique that can be used for adding the flavor augmenting chemical.

Note, also, that the order in which the preservation and flavor augmentation steps of this invention are carried out is not important so long as the cut fresh produce is subjected to both steps before being stored for any significant length of time. For example, while the above description indicates that the above flavor augmentation treatment follows the preservation treatment, this flavor augmentation treatment can precede the preservation treatment, if desired. In addition, both of these treatments can also be carried out simultaneously, if desired.

In this regard, in an especially interesting embodiment of this invention, the above flavor augmentation and preservation treatments are done together by including the active ingredients used in both treatments in the same aqueous treating composition. This is particularly advantageous, since it eliminates the need for separating treating steps and hence makes the inventive process easier to carry out. In addition, it also makes controlling the desired amounts of chemicals which are applied to the fresh produce easier, since it eliminates the risk that chemicals applied in a first treatment step are washed off the fresh produce in a second treatment step.

Post Treatment Storage

Once the cut fresh produce is treated in the manner indicated above, it can then be stored and handled in a conventional manner. That is to say, no special treatment or handling procedure is necessary. Thus, the treated fresh cut produce need not be stored in any special way such as in a vacuum, or under reduced or elevated pressure, or in an inert or special atmosphere, or under water or in contact with a liquid. Rather, the treated fresh cut produce can be stored exposed to the ambient atmosphere under conditions noiinally encountered in the home, e.g., atmospheric pressure at room temperature or in a refrigerator above the freezing point of water. On the other hand, it can also be stored using any technique normally used for storing fresh cut produce, if desired.

So, for example, if the treated produce is to be consumed with several hours of treatment, it can be stored unpackaged, if desired. In other words, it can be left exposed to the open atmosphere until consumed, either at room temperature or in a refrigerator above the freezing point of water.

On the other hand, the treated fresh cut produce can also be stored packaged, under a standard atmosphere (i.e., in normal air) or under a modified or controlled atmosphere such as those containing elevated carbon dioxide levels, elevated nitrogen levels, reduced oxygen levels, reduced or elevated ethylene levels, or any combination thereof. In addition, it can also be vacuum packaged such as, for example, by storing in a plastic bag which has been sealed after the atmosphere inside the bag has been evacuated by means of a slight vacuum.

Examples of suitable packaging that can be used for storing the treated fresh cut produce of this invention, whether at atmospheric pressure or reduced pressure and whether in a standard atmosphere or a modified atmosphere, include bags made from food grade plastics such as polyethylene, polystyrene and the like, "clam shell" packages made from such plastics, multi-layer polyolefin bags such as Food Saver bags, Cryovac PD900, or Cryovac B900, bag from Cryovac Inc. Moreover, such packaging can be structured either to be closed to the outside atmosphere or be open to the outside atmosphere in the sense of allowing the treated fresh cut produce inside the package to contact the atmosphere outside the package. For example, in those situations in which a plastic bag is used for storage, the plastic film forming the walls of the plastic bags can be continuous or it can be provided with suitable microperforations and/or macroperferations to enable the treated fresh cut produce to breathe.

In this regard, it should be remembered that when a piece of fresh produce is cut and/or peeled and then packaged, the fresh produce is not dead. Rather, it is still living, although it is in the process of dying. As a result, for at least a week or two, the chemical processes that occur inside the produce continue to happen. So, it may be desirable in some situations that the plastic bag or other container used for storage include perforations or other structure to allow access to the open atmosphere surrounding the bag or container so that the treated fresh cut produce can still continue to breathe.

Meanwhile, in other situations, it may also be desirable that the plastic bag or other container be completely closed to the outside atmosphere. As indicated above, when a piece of fresh produce is cut and/or peeled and then packaged, the fresh cut produce continues living. Oftentimes, this means that the fresh cut produce will continue consuming oxygen and generating carbon dioxide due to chemical reactions occurring inside its body. In certain situations, it may be desirable to store the treated fresh cut produce of this invention in a modified atmosphere having a reduced oxygen concentration and an increased carbon dioxide concentration. In these situations, it may be desirable to store the treated fresh cut produce in a bag or container which is closed to the surrounding atmosphere, as this enables the concentration of oxygen inside the container to be reduced and the concentration of carbon dioxide increased autogenously, i.e., as a result of the chemical reactions naturally inside the treated fresh cut produce without influence from an external source.

Of course, combinations of these approaches can be used as well. For example, a modified atmosphere can be introduced into the package, after which the composition of this modified atmosphere can be allowed to change even further as a result of the chemical reactions that continue to occur inside the produce in the manner described above.

Still another way of storing the treated fresh cut produce of this invention is to mix it with another food product such as yogurt, ice-cream, cream cheese and the like.

The technology used for packaging fresh fruits and vegetables for storage is highly advanced. Accordingly, skilled packaging experts should have no difficulty in selecting the appropriate packages to use for packaging particular fresh produce products which have been preserved and flavor-augmented by this invention and which are intended to be stored under a predetermined set of target storage conditions.

Regarding temperature, while the treated fresh cut produce can be stored at room temperature or above, it is desirable to store it at below 20° C., more preferably below 10° C., even more preferably below 5° C., to reduce microbial growth. However, storing at less than −5° C., or even at less than 0° C., is desirably avoided to prevent freezing. For example, storing at −2° C. to 7° C., 0-6° C., or even 2-5° C. is desirable. Nonetheless, the treated fresh cut produce can be frozen, if desired.

Generally speaking, any conventional storage technique can be used for storing the treated fresh cut produce produced by this invention. Skilled packaging experts should have no difficulty in selecting which particular storage technique is appropriate for each particular application of the technology of this invention.

Finally, while it is most convenient in accordance with this invention to carry out the flavor augmentation step of this invention before storage of the preserved cut produce has begun, it is also possible in accordance with this invention to carry out this flavor augmentation step after storage has begun.

In addition, while the treated fresh cut produce produced by this invention will noiinally be stored in a manner which maintains its character as "fresh," it is also possible in accordance with this invention to subject this treated fresh cut produce product to other storage techniques such as freezing, freeze-drying, canning or drying in the sense of producing a dried fruit or dried vegetable.

Although only a few embodiments of this invention have been described above, it should be appreciated that many modifications can be made without departing from the spirit and scope of this invention. All such modifications are intended to be included within the scope of this invention, which is to be limited only by the following claims:

The invention claimed is:

1. A preserved and flavor augmented cut fresh produce product comprising
   (1) a piece of cut fresh produce (i),
   (2) a preservative (ii) comprising calcium ascorbate, calcium erythrobate or a mixture thereof, the concentration of citric acid in the preservative, if any, being not greater than 10 wt. % on a dry weight basis, this preservative being present in an amount sufficient to preserve at least one of the texture, firmness, flavor, appearance, crispness and color of the piece of cut fresh produce, and
   (3) one or more flavor augmenting chemicals (iii) impregnated into the piece of cut fresh produce, this one or more flavor augmenting chemicals being present in an amount which is sufficient to compensate for a loss of flavor notes the cut fresh produce product will experience during storage but not so much as to introduce foreign flavor notes into the cut fresh cut produce product.

2. The cut fresh produce product of claim 1, wherein the identity and amount of the one or more flavor augmenting chemicals is determined by carrying out a chemical analysis on two different test samples of the same cut fresh produce and then comparing the results of these two different chemical analyses, the first of these chemical analyses being carried on a first test sample before storage, the second of these chemical analyses being carried on a second test sample after storage.

3. The cut fresh produce product of claim 2, wherein the first chemical analysis is carried out immediately after the first test sample is formed by cutting.

4. The cut fresh produce product of claim 2, wherein the first chemical analysis is carried out within 1 week after the first test sample is formed by cutting.

5. The cut fresh produce product of claim 4, wherein the first chemical analysis is carried out within 1 day after the first test sample is formed by cutting.

6. The cut fresh produce product of claim 4, wherein the first test sample on which the first chemical analysis is carried out is obtained from a piece of whole produce which has been harvested no greater than 2 weeks before the first chemical analysis is done.

7. The cut fresh produce product of claim 6, wherein the first test sample on which the first chemical analysis is carried out is obtained from a piece of whole produce which has been harvested no greater than 1 day before the first chemical analysis is done.

8. The cut fresh produce product of claim 4, wherein the fresh produce product is intended to be stored under a predetermined set of storage conditions including at least one of a particular period of storage time and a particular manner of storage, or both, and further wherein the second test sample on which the second chemical analysis is carried out is subjected to the same predetermined set of storage conditions before the second chemical analysis is carried out.

9. The cut fresh produce product of claim 8, wherein the predetermined set of storage conditions includes both a particular period of storage time and a particular manner of storage.

10. The cut fresh produce product of claim 2, wherein the fresh produce product is intended to be stored under a predetermined set of storage conditions including at least one of a particular period of storage time and a particular manner of storage, or both, and further wherein the second test sample on which the second chemical analysis is carried out is subjected to the same predetermined set of storage conditions before the second chemical analysis is carried out.

11. The cut fresh produce product of claim 10, wherein the predetermined set of storage conditions includes both a particular period of storage time and a particular manner of storage.

12. The cut fresh produce product of claim 1, wherein the cut fresh produce product is intended to be stored under a predetermined set of storage conditions during which storage the fresh cut produce product will inherently experience a loss of one or more flavor notes, and further wherein both the identity and amount of the one or more flavor augmenting chemicals (iii) that are present in the cut fresh produce product have been determined by
   (a) carrying out a first chemical analysis on a first test sample, this first test sample comprising a piece the same fresh produce as produce (i), thereby identifying the particular flavor-producing chemicals responsible for imparting flavor to this fresh produce, this first chemical analysis being carried out immediately after the fresh produce forming this first test sample has been cut,
   (b) carrying out a second chemical analysis on a second test sample, this second test sample also comprising a piece the same fresh produce as produce (i) as well as a preservative (ii), the identity and amount of this preservative (ii) in this second test sample being the same as the identity and amount of the preservative (ii) in said fresh produce product, the second test sample also having been stored under the same set of target storage conditions as the cut fresh produce product intended to be stored, and
   (c) comparing the results of the chemical analysis of step (a) with the results of the chemical analysis of step (b) to determine the identities and amounts of flavor-producing chemicals that are anticipated to be lost from the piece of fresh fruit as a result of cutting and storage for the predetermined period of time.

13. The cut fresh produce product of claim 1, wherein the loss of one or more flavor notes is due to the loss of a particular naturally-occurring flavor-producing chemical which is present in the fresh produce before it is cut, and further wherein at least one of the flavor augmenting chemicals (iii) is identical to this naturally-occurring flavor-producing chemical.

14. A process for preserving and augmenting the flavor of a piece of cut fresh produce which is intended to be consumed a predetermined period of time after the fresh produce from which it is made has been cut, the process comprising (1) contacting the cut piece of fresh produce with an aqueous preservative composition, thereby producing a preserved cut piece of fresh produce, the aqueous preservative composition comprising calcium ascorbate, calcium erythorbate or a mixture thereof, the concentration of citric acid in the aqueous preservative composition, if any, being not greater than 10 wt. % on a dry weight basis and (2) impregnating the preserved cut piece of fresh produce with one or more flavor augmenting chemicals in an amount which is sufficient to replace the flavor notes that are anticipated to be lost from the preserved cut piece of fresh produce as a result of being stored for the predetermined period of time but not so much as to introduce foreign flavor notes into the preserved cut piece of fresh produce.

15. The process of claim 14, wherein the identity and amount of the one or more flavor augmenting chemicals is determined by carrying out a chemical analysis on two different test samples of the same cut fresh produce and then comparing the results of these two different chemical analyses, the first of these chemical analyses being carried on a first test sample before storage, the second of these chemical analyses being carried on a second test sample after storage.

16. The process of claim 15, wherein the first chemical analysis is carried out within 1 week after the first test sample is formed by cutting.

17. The process of claim 16, wherein the first chemical analysis is carried out within 1 day after the first test sample is formed by cutting.

18. The process of claim 16, wherein the first test sample on which the first chemical analysis is carried out is obtained from a piece of whole produce which has been harvested no greater than 2 weeks before the first chemical analysis is done.

19. The process of claim 16, wherein the first test sample on which the first chemical analysis is carried out is obtained from a piece of whole produce which has been harvested no greater than 1 day before the first chemical analysis is done.

20. The process of claim 14, wherein the cut fresh produce product is intended to be stored under a predetermined set of storage conditions during which storage the fresh cut produce product will inherently experience a loss of one or more flavor notes, and further wherein both the identity and amount of the one or more flavor augmenting chemicals (iii) that are present in the cut fresh produce product have been determined by (a) carrying out a first chemical analysis on a first test sample, this first test sample comprising a piece the same fresh produce as produce (i), thereby identifying the particular flavor-producing chemicals responsible for imparting flavor to this fresh produce, this first chemical analysis being carried out immediately after the fresh produce forming this first test sample has been cut, (b) carrying out a second chemical analysis on a second test sample, this second test sample also comprising a piece the same fresh produce as produce (i) as well as a preservative (ii), the identity and amount of this preservative (ii) in this second test sample being the same as the identity and amount of the preservative (ii) in said fresh produce product, the second test sample also having been stored under the same set of target storage conditions as the cut fresh produce product intended to be stored, and (c) comparing the results of the chemical analysis of step (a) with the results of the chemical analysis of step (b) to determine the identities and amounts of flavor-producing chemicals that are anticipated to be lost from the piece of fresh fruit as a result of cutting and storage for the predetermined period of time.

21. The process of claim 14, wherein the preservative and the one or more flavor augmenting chemicals are applied to the cut fresh fruit from the same aqueous solution.

22. The process of claim 14, wherein after the preserved cut piece of fresh is impregnated with the flavor enhancing chemical in step (2), it is stored.

23. The process of claim 22, wherein after the preserved cut piece of fresh is impregnated with the flavor enhancing chemical in step (2), it is stored under one or more of the following storage conditions:
   (a) the impregnated, preserved cut piece of fresh produce is stored exposed to the ambient atmosphere,
   (b) the impregnated, preserved cut piece of fresh produce is stored in a bag or container which is closed to the ambient atmosphere, wherein the atmosphere inside the bag consists of a controlled atmosphere having an elevated level of carbon dioxide, an elevated carbon dioxide level, an elevated nitrogen level, a reduced oxygen level, an elevated ethylene level, a reduced ethylene levels or any combination thereof, and
   (c) vacuum packaged.

24. The process of claim 14, wherein the concentration of citric acid in the aqueous preservative composition, if any, is not greater than 1 wt. % on a dry weight basis.

25. The cut fresh produce product of claim 1, wherein the concentration of citric acid in the aqueous preservative composition, if any, is not greater than 1 wt. % on a dry weight basis.

26. The cut fresh produce product of claim 1, wherein the one or more flavor augmenting chemicals (iii) is impregnated into the piece of cut fresh produce by at least one of dipping, inundating with a liquid sheet, spraying or sprinkling.

27. The process of claim 14, wherein the one or more flavor augmenting chemicals (iii) is impregnated into the piece of cut fresh produce by at least one of dipping, inundating with a liquid sheet, spraying or sprinkling.

* * * * *